United States Patent
Dong et al.

(10) Patent No.: US 10,421,118 B2
(45) Date of Patent: Sep. 24, 2019

(54) MANUFACTURING METHOD OF MIDDLE FRAME FOR DISPLAY SCREEN, DISPLAY SCREEN AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xue Dong, Beijing (CN); Haiwei Sun, Beijing (CN); Wei Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 201 days.

(21) Appl. No.: 15/337,005

(22) Filed: Oct. 28, 2016

(65) Prior Publication Data
US 2017/0189957 A1    Jul. 6, 2017

(30) Foreign Application Priority Data

Jan. 4, 2016    (CN) .......................... 2016 1 0004389

(51) Int. Cl.
| | |
|---|---|
| *B22D 19/00* | (2006.01) |
| *B22D 17/24* | (2006.01) |
| *B29C 45/14* | (2006.01) |
| *B29C 45/26* | (2006.01) |
| *B29C 45/40* | (2006.01) |
| *B29C 45/72* | (2006.01) |
| *B29K 105/00* | (2006.01) |

(Continued)

(52) U.S. Cl.
CPC ............. *B22D 19/00* (2013.01); *B22D 17/24* (2013.01); *B29C 45/14065* (2013.01); *B29C 45/26* (2013.01); *B29C 45/40* (2013.01); *B29C 45/7207* (2013.01); *B29C 2045/14155* (2013.01); *B29K 2105/0067* (2013.01); *B29K 2709/08* (2013.01); *B29L 2031/3475* (2013.01)

(58) Field of Classification Search
CPC ........ B22D 19/00; B22D 17/24; B29C 45/14; B29C 45/14065; B29C 45/26; B29C 45/40; B29C 45/72; B29C 45/7207; B29C 2045/14155
USPC .......................................... 164/112
See application file for complete search history.

(56) References Cited

FOREIGN PATENT DOCUMENTS

| CN | 103587030 A | 2/2014 |
|---|---|---|
| CN | 104339529 A | 2/2015 |

(Continued)

OTHER PUBLICATIONS

The Third Chinese Office Action dated Dec. 12, 2017; Appln. No. 201610004389.6.

(Continued)

*Primary Examiner* — Kevin P Kerns
(74) *Attorney, Agent, or Firm* — Ladas & Parry LLP

(57) ABSTRACT

A manufacturing method of a middle frame for a display screen, a display screen and a display device is provided. The method includes: fixing a glass cover plate of the display screen to a first mold; bonding a second mold with the first mold, so as to form a cavity for forming the middle frame on a periphery of the glass cover plate; injecting a molten material into the cavity; cooling the molten material to form the middle frame, wherein the middle frame is integrally injected and molded on the periphery of the glass cover plate.

16 Claims, 3 Drawing Sheets

(51) Int. Cl.
 *B29K 709/08* (2006.01)
 *B29L 31/34* (2006.01)

(56) References Cited

FOREIGN PATENT DOCUMENTS

| | | |
|---|---|---|
| CN | 104427801 A | 3/2015 |
| CN | 104924625 A | 9/2015 |
| JP | 5252576 B2 | 7/2013 |

OTHER PUBLICATIONS

The First Chinese Office Action dated May 31, 2017; Appln. No. 201610004389.6.
The Second Chinese Office Action dated Oct. 19, 2017; Appln. 201610004389.6.

-- PRIOR ART --

MANUFACTURING METHOD OF MIDDLE FRAME FOR DISPLAY SCREEN, DISPLAY SCREEN AND DISPLAY DEVICE

TECHNICAL FIELD

Embodiments of the present disclosure relate to a manufacturing method of a middle frame for a display screen, a display screen and a display device.

BACKGROUND

With competition of a liquid crystal display industry becomes increasingly fierce, ultrathin and narrow frame design of products has become a main stream of industry development, and a requirement for narrower and smaller frame space and a design requirement for more reliable structural strength are put forward for a liquid crystal module and even a whole mobile phone.

SUMMARY

An embodiment of the present disclosure provides a manufacturing method of a middle frame for a display screen, including: fixing a glass cover plate of the display screen to a first mold; bonding a second mold with the first mold, so as to form a cavity for forming the middle frame on a periphery of the glass cover plate; injecting a molten material into the cavity; cooling the molten material to form the middle frame, wherein the middle frame is integrally injected and molded on the periphery of the glass cover plate.

Another embodiment of the present disclosure provides a display screen, wherein, a middle frame of the display screen is manufactured by adopting the manufacturing method of the middle frame for the display screen as described above.

Yet another embodiment of the present disclosure provides a display device, including the display screen as described above.

BRIEF DESCRIPTION OF THE DRAWINGS

In order to clearly illustrate the technical solution of the embodiments of the disclosure, the drawings needing to be used in the embodiments or relevant technical description will be briefly described in the following; it is obvious that the described drawings are only related to some embodiments of the disclosure and thus are not imitative of the disclosure.

DETAILED DESCRIPTION

Figure 1:
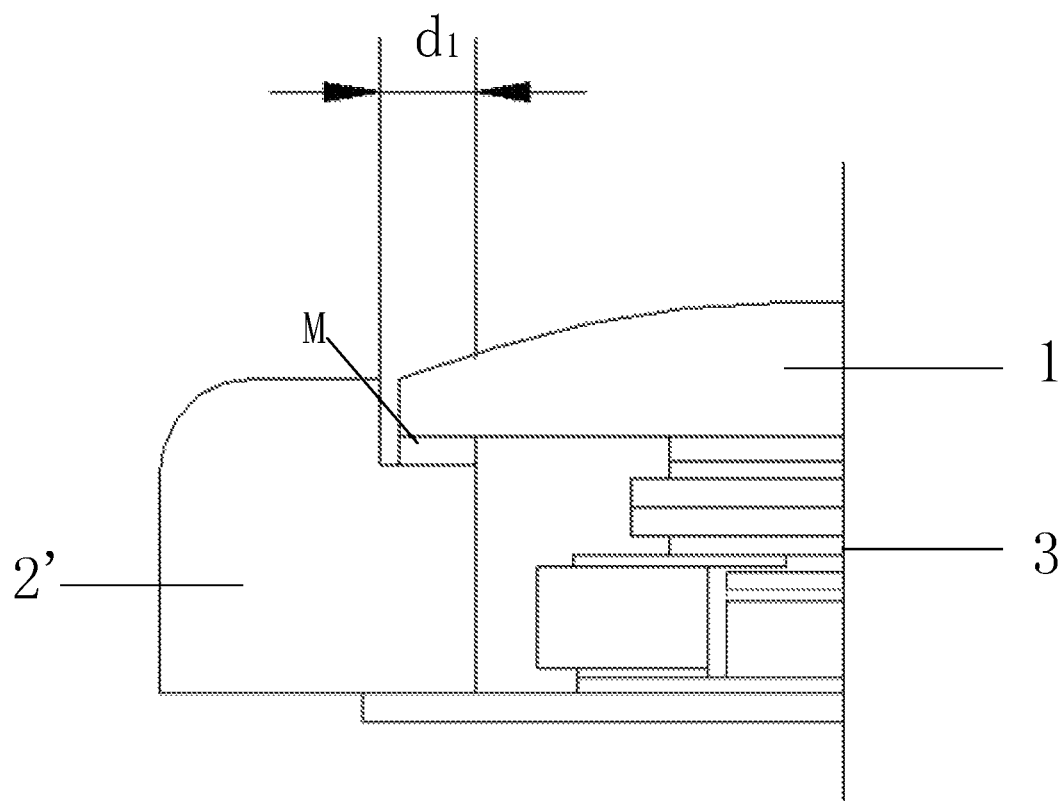
FIG. 1 is a structural schematic diagram of a middle frame portion for a mobile phone in a related art.

A structural design of a mobile phone in the related art is as shown in FIG. 1, a module with a glass cover plate 1 is bonded with a mobile phone middle frame 2' through an adhesion component M (e.g., hot melt adhesive or foam adhesive); although the bonding is more firm, an adhesive dispensing procedure is complex (comprising: adhesive dispensing, assembling, pressure maintaining and detecting). If assembling is not flat, defects such as warping, adhesive overflow are likely to occur. A curing period for the adhesive dispensed is long. Completing curing commonly needs 12 hours, the efficiency is low; the assembling process is complex, and consistency of the assembling process is not easy to control; besides, no matter adhesive dispensing or foam adhesive connection is adopted, a certain space is occupied on a mobile phone frame, a width $d_1$ of an inner side face of the middle frame facing the glass cover plate in a direction parallel to one main surface of the glass cover plate 1 is 0.6 mm, which thus does not facilitate a narrow frame design.

The technical solutions of the embodiments of the present disclosure will be described in a clearly and fully understandable way in connection with the drawings. It is obvious that the described embodiments are just a part but not all of the embodiments of the present disclosure. Based on the embodiments in the present disclosure, those skilled in the art can obtain other embodiment(s), without any inventive work, which should be within the scope of the present disclosure.

In description of the present disclosure, what needs to be explained is that, unless otherwise stated, "a plurality of" refers to two or more; orientation or positional relationship indicated by terms "up", "down", "left", "right", "inside", "outside", "front", "rear", "head", "tail" and the like is orientation or positional relationship shown based on the drawings, which is just used for facilitating description of the present disclosure and simplifying the description, rather than indicating or implying that indicated devices or elements must have specific orientations and are configured and operated at specific orientations, and thus are not imitative of the present disclosure. Besides, terms such as "first", "second", "third" and the like are only used for a purpose of description and cannot be used for indicating or implying relative importance.

In the description of the present disclosure, what further needs to be explained is that, unless otherwise specified, terms "installed", "connected" and "linked" should be broadly understood, for example, they may be fixedly connected, detachably connected, or integrally connected; may be mechanically connected or electrically connected; or may be directly connected, or indirectly connected by an intermediate medium. Those skilled in the art can understand specific meanings of the above terms in the present disclosure according to specific circumstances.

In a manufacturing method of a middle frame for a display screen, a display screen and a display device provided by embodiments of the present disclosure, by bonding the middle frame with a glass cover plate in an injection molding manner, an assembly procedure is saved, and compatible products have enough bonding strength; meanwhile a narrower frame design can be achieved.

Figure 2:
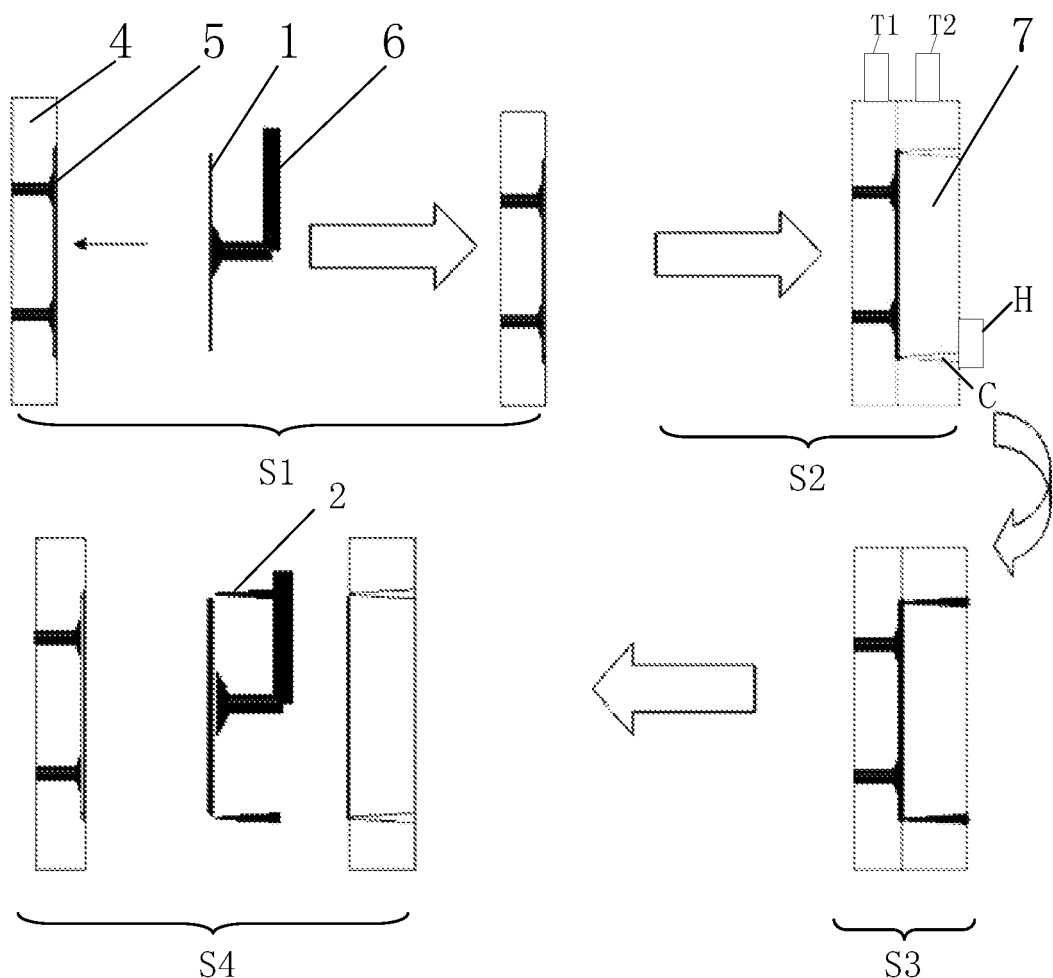
FIG. 2 is a flow diagram of a manufacturing method of a middle frame for a display screen according to Embodiment I of the present disclosure.

Embodiment I:

As shown in FIG. 2, the embodiment provides a manufacturing method of a middle frame for a display screen, and the manufacturing method includes steps of:

S1: fixing a glass cover plate 1 of the display screen to a movable mold 4;

In step S1, the fixing the glass cover plate 1 of the display screen to the movable mold 4 includes: moving the glass cover plate 1 of the display screen to a position where the movable mold 4 is located through a manipulator 6, and fixing the glass cover plate 1 of the display screen to the movable mold 4 through a sucker 5. An automatic operation is achieved through the manipulator 6, and damage to the glass cover plate 1 is also avoided.

A form of the sucker 5 is not limited. For example, the sucker 5 can include a suction nozzle and a vacuum air source connected with the suction nozzle; the suction nozzle is arranged on a side of the movable mold 4, and the vacuum air course penetrating the movable mold 4 is connected with a vacuum source; the glass cover plate 1 is fixed through vacuum adsorption force, and therefore damage to the display screen is reduced. For example, an adsorption surface of the sucker 5 is made from a flexible material, which avoids damage to the glass cover plate 1.

S2: bonding the movable mold 4 with a fixed mold 7 to form a cavity C for forming the middle frame 2 on a periphery of the glass cover plate 1; a shape of the cavity C corresponds to that of the middle frame 2 to be formed and can be adaptively adjusted according to middle frames 2 of different types. For example, the shape of the cavity C is same as that of the middle frame 2 to be formed, and a size of the cavity C is equal to that of the middle frame 2 to be formed.

In step S2, the bonding the movable mold 4 with the fixed mold 7 includes: installing the movable mold 4 on a movable machine tool body T1 of a machine tool, installing the fixed mold 7 on a fixed machine tool body T2 of the machine tool, and completing the bonding the movable mold 4 with the fixed mold 7 by moving the movable machine tool body T1 to the fixed machine tool body T2.

S3: injecting the molten material into the cavity C;

In step S3, the injecting the molten material into the cavity C includes: injecting the molten material into the cavity C through a feeding device, wherein a hot runner H with three entries which is connected to the feeding device is provided in the fixed mold 7. For example, the entries of the hot runner H each have a diameter of 0.6 mm so as to improve injection molding efficiency.

S4: cooling and separating the molds, completing integrally injecting and molding the middle frame 2 on the periphery of the glass cover plate 1. After the cooling and separating the molds in step S4, the formed display screen can be taken out through the manipulator 6.

According to a manufacturing process provided in Embodiment I, by bonding the middle frame 2 for the display screen with the glass cover plate in an injection molding manner, one assembly procedure is saved, and compatible products have enough bonding strength; meanwhile a narrower frame design can be achieved, which has a positive meaning in improving market competitiveness of mobile phone products.

Besides, the molten material in Embodiment I can be a plastic material, that is to say, the plastic middle frame 2 can be formed in Embodiment I. Such design manner that a periphery is wrapped by plastic replaces an adhesion manner by using adhesive or double-sided foam, a side wall frame space is saved, a narrower frame design is achieved, and meanwhile defects such as adhesive overflow and warping are avoided.

In the related art, a traditional mobile phone middle frame 2' is attached to the glass cover plate 1 by dispensing glue or foam, a certain space is occupied on a mobile phone frame, a width of an inner side face of the middle frame facing the glass cover plate in a direction parallel to a main surface of the glass cover plate 1 is not lower than 0.6 mm generally. In the embodiment of the present disclosure, the middle frame 2 and the glass cover plate 1 are integrally injected and molded; in a direction parallel to a main surface X of the glass cover plate 1, a width d2 of a surface M of the glass cover plate 1 in contact with the middle frame 2 is made to be smaller than 0.6 mm, and further, a molding width of the middle frame is 0.3 mm; it is thus clear that, compared with the related art, the manufacturing method provided by Embodiment I facilitates molding of a narrow edge. Currently, a narrow edge of a display screen produced by using the method of Embodiment I can reach 1.65-2.05 mm to the minimum extent.

Furthermore, the molten material in Embodiment I can also be a metal material, that is to say, a metal middle frame 2 can be formed, and the middle frame 2 of the display screen can have metal texture.

Of course, the method of Embodiment I is not limited to a certain specific form. On a basis of above integral molding, the method further includes other processes, for example, processing surface textures of the mobile phone middle frame 2 through grinding, polishing, electroplating, washing or painting or other processes.

Furthermore, before the fixing the glass cover plate 1 of the display screen to the movable mold 4 in the step S1, the manufacturing method may further include: manufacturing a C angle (Chamfer) or an R angle (Fillet) on an edge of the glass cover plate 1, so that the middle frame 2 can wrap the glass cover plate after injection molding, to increase bonding strength between the middle frame 2 and the glass cover plate.

Embodiment II

Figure 3:
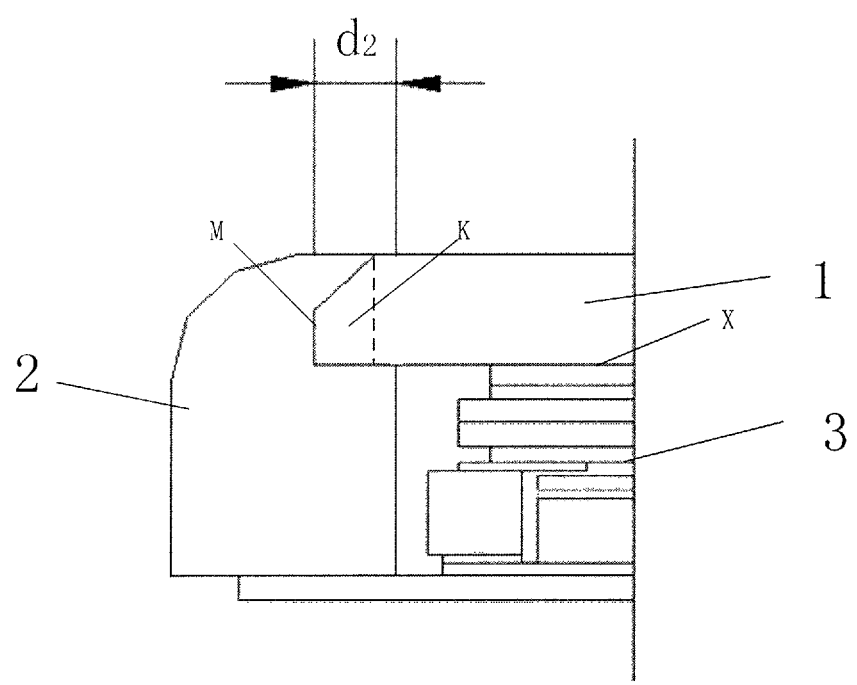
FIG. 3 a structural schematic diagram of a middle frame portion for a display screen according to Embodiment II of the present disclosure.

As shown in FIG. 3, Embodiment II further provides a display screen, manufactured by using the manufacturing method of integrally molding the middle frame in Embodiment I. Specific content of the manufacturing method has been recorded in Embodiment I described above in detail, which is not repeated here. The display screen includes a glass cover plate 1, a display unit 3 and a middle frame 2, wherein, a connection structure with a cross section of right angle trapezoid K is formed on an edge of the glass cover plate 1 matched with the middle frame 2; correspondingly, a groove matched with the connection structure and having a cross section of right angle trapezoid is opened in the middle frame 2; and the connection structure and the groove can be firmly fixed. Due to such a design, a contact area between the display cover plate 1 and the middle frame 2 is increased, meanwhile bonding strength between the display cover plate 1 and the middle frame 2 is enhanced, defects such as adhesive overflow and warping are avoided, more importantly, a side wall frame space is further saved, and a narrower frame design can be achieved.

Thus, Embodiment II has advantageous effects same as Embodiment I, that is, by bonding the middle frame 2 of the display screen with the glass cover plate in an injection molding manner, one assembly procedure is saved, and compatible products have enough bonding strength; meanwhile the narrower frame design can be achieved, which has positive meaning in improving market competitiveness of mobile phone products.

Embodiment III

Embodiment III provides a display device, which comprises the display screen in Embodiment II. The display device can be a mobile phone, a tablet personal computer or other devices.

Hereinafter, the embodiment of the present disclosure is explained with a mobile phone as an example. The embodiment provides an integral injection molding method of a middle frame for a display screen of a mobile phone and a glass cover plate 1. The molded glass cover plate is placed in a plastic mold for the middle frame 2 and sucked through a sucker 5, and then molds are combined to perform injection molding of the middle frame 2; in order to increase bonding strength between the glass cover plate 1 and the middle frame 2, a C angle is chamfered on a side edge of the glass cover plate 1, and glass cover plate 1 is wrapped in the middle frame 2 after injection molding of the middle frame 2; such a process solves defects such as adhesive overflow or glass warping in a current narrow frame caused due to a small width of a side surface edge for dispensing adhesive; meanwhile an assembly procedure of the glass cover plate and a mobile phone middle frame is saved, and therefore a mobile phone product yield is increased. Besides, compared with the related art, the mobile phone more facilitates forming of a narrow edge. A narrow edge of the display screen of the mobile phone can reach 1.65-2.05 mm to the minimum extent.

Of course, the method can be widely applicable to a liquid crystal module industry and meanwhile can be applied to other relevant industries.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The present application claims priority of Chinese Patent Application No. 201610004389.6 filed on Jan. 4, 2016, the present disclosure of which is incorporated herein by reference in its entirety as part of the present application.

The invention claimed is:

1. A manufacturing method of a middle frame for a display screen, comprising:
   fixing a glass cover plate of the display screen to a first mold;
   bonding a second mold with the first mold and forming a cavity for forming the middle frame on a periphery of the glass cover plate;
   injecting a molten material into the cavity;
   cooling the molten material to form the middle frame, wherein the middle frame is integrally injected and molded on the periphery of the glass cover plate,
   wherein before the fixing the glass cover plate of the display screen to the first mold, the manufacturing method further comprises: manufacturing a C angle or an R angle on an edge of the glass cover plate, so that the middle frame to be formed can wrap the edge of the glass cover plate, to increase bonding strength between the middle frame and the glass cover plate, and in a direction parallel to a main surface of the glass cover plate, a width d2 of a surface of the glass cover plate in contact with the middle frame is smaller than 0.6 mm.

2. The manufacturing method of the middle frame for the display screen according to claim 1, wherein, the fixing the glass cover plate of the display screen to the first mold includes: moving the glass cover plate of the display screen to a position where the first mold is located through a manipulator, and fixing the glass cover plate of the display screen to the first mold through a sucker.

3. The manufacturing method of the middle frame for the display screen according to claim 2, wherein, the molten material is a plastic material or a metal material.

4. The manufacturing method of the middle frame for the display screen according to claim 2, wherein, the injecting the molten material into the cavity includes: injecting the molten material into the cavity through a feeding device, wherein, a hot runner with three entries which is connected to the feeding device is provided in the second mold.

5. The manufacturing method of the middle frame for the display screen according to claim 2, further comprising: after the cooling the molten material to form the middle frame, taking out the middle frame and the glass cover plate which are integrally injected and molded, through the manipulator.

6. The manufacturing method of the middle frame for the display screen according to claim 1, wherein, the bonding the first mold and a second mold includes: installing the first mold on a movable machine tool body of a machine tool, installing the second mold on a fixed machine tool body of the machine tool, and completing the bonding the first mold and the second mold by moving the movable machine tool body to the fixed machine tool body.

7. The manufacturing method of the middle frame for the display screen according to claim 6, wherein, the molten material is a plastic material or a metal material.

8. The manufacturing method of the middle frame for the display screen according to claim 6, wherein, the injecting the molten material into the cavity includes: injecting the molten material into the cavity through a feeding device, wherein, a hot runner with three entries which is connected to the feeding device is provided in the second mold.

9. The manufacturing method of the middle frame for the display screen according to claim 6, further comprising: after the cooling the molten material to form the middle frame, taking out the middle frame and the glass cover plate which are integrally injected and molded, through a manipulator.

10. The manufacturing method of the middle frame for the display screen according to claim 1, wherein, the molten material is a plastic material or a metal material.

11. The manufacturing method of the middle frame for the display screen according to claim 10, wherein, the injecting the molten material into the cavity includes: injecting the molten material into the cavity through a feeding device, wherein, a hot runner with three entries which is connected to the feeding device is provided in the second mold.

12. The manufacturing method of the middle frame for the display screen according to claim 10, further comprising: after the cooling the molten material to form the middle frame, taking out the middle frame and the glass cover plate which are integrally injected and molded, through a manipulator.

13. The manufacturing method of the middle frame for the display screen according to claim 1, wherein, the injecting the molten material into the cavity includes:
   injecting the molten material into the cavity through a feeding device, wherein, a hot runner with three entries which is connected to the feeding device is provided in the second mold.

14. The manufacturing method of the middle frame for the display screen according to claim 13, further comprising: after the cooling the molten material to form the middle frame, taking out the middle frame and the glass cover plate which are integrally injected and molded, through a manipulator.

15. The manufacturing method of the middle frame for the display screen according to claim 1, further comprising: after the cooling the molten material to form the middle frame, taking out the middle frame and the glass cover plate which are integrally injected and molded, through a manipulator.

16. The manufacturing method of the middle frame for the display screen according to claim 1, wherein, the first mold is movable with respect to the second mold.

\* \* \* \* \*